April 7, 1942. R. B. DAY 2,278,836
REACTIVATING CATALYST
Filed July 31, 1940
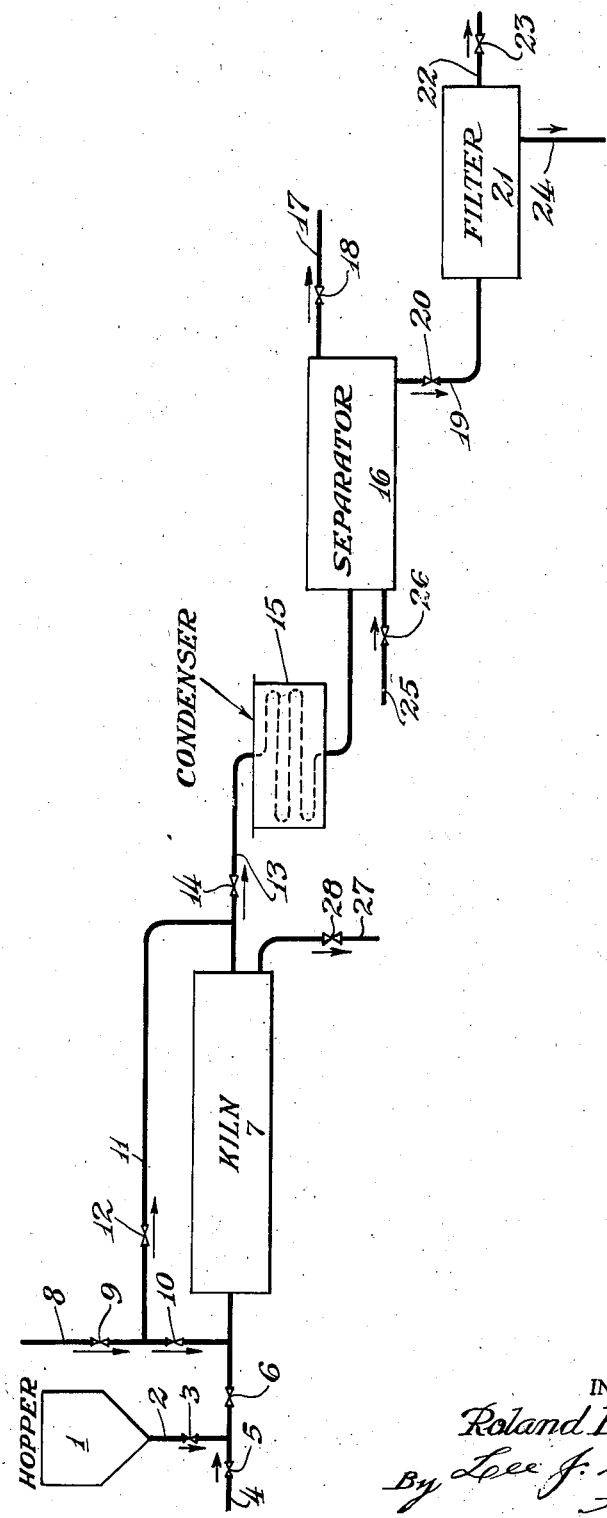
INVENTOR.
Roland B. Day
By Lee J. Gary
Attorney.

Patented Apr. 7, 1942

2,278,836

UNITED STATES PATENT OFFICE 2,278,836

REACTIVATING CATALYST

Roland B. Day, Chicago, Ill., assignor to Universal Oil Products Company, Chicago, Ill., a corporation of Delaware Application July 31, 1940, Serial No. 348,983

5 Claims. (Cl. 252—242)

This invention relates to a process for reactivating spent carbonized catalytic materials. More particularly it relates to a process for removing carbonaceous or hydrocarbonaceous materials from catalytic agents which have been used in the form of finely divided powders. Such catalysts comprise those useful for cracking and reforming operations and are of a refractory type, described in greater detail hereinafter, which are susceptible to reactivation by treatment with oxygen-containing gases at elevated temperatures.

The use of oxygen-containing gases for reactivating carbonized catalytic agents is known and the present invention relates to an improved method of activating and recovering spent powdered catalysts which are difficulty reactivated and recovered because of the fine degree of subdivision of the particles.

In one specific embodiment the present invention comprises a process for reactivating spent catalytic agents useful in hydrocarbon conversions, said catalyst being used in the form of finely divided powders of dimensions approaching the colloidal, by contacting said catalysts with an oxygen-containing gas and in the presence of steam, whereby the carbonaceous deposits are removed, cooling the reaction mixture to a point where the steam condenses, thereby causing the separation of the powdered catalyst in the water layer, and recovering the reactivated catalyst therefrom.

The invention is further illustrated by reference to the accompanying drawing, which is purely diagrammatic and should not be interpreted as limiting the invention to the exact apparatus shown. No attempt has been made to proportion the equipment or to present it in mechanical detail.

Spent carbonized catalyst of the character hereinafter described is passed from hopper 1 through line 2 and valve 3. The reactivating gases which have been heated to a suitable temperature, usually within the range of 700 to 1100° F., are passed through line 4, containing valve 5, and mixed with the powdered catalyst, thereafter passing through valve 6 to kiln 7. Steam may be introduced through line 8 containing valves 9 and 10. The kiln may be of the rotating type or may be of the vertical type burner which may be heated externally, although ordinarily this is not necessary, sufficient heat being generated to take care of all heat requirements. Such of the catalyst as may be separated by gravity is withdrawn through line 27 and valve 28. The reactivation gases and the remaining catalyst pass through line 13, containing valve 14, to condenser 15 wherein they are cooled to a temperature sufficient to condense the steam. Additional quantities of steam may be introduced through line 11 and valve 12 to line 13. If desired, all the steam may be introduced at this point, although the usual practice is to divide the steam as indicated in the drawing. In the condenser droplets of condensed steam tend to form around the catalyst particles thus carrying the powdered catalyst out of suspension in the spent reactivating gases as the droplets coalesce thereby causing a separation which makes subsequent recovery of the catalyst relatively easy. The mixture passes into separator 16 and the spent reactivation gases are removed through line 17 and valve 18. Although it is not shown in the drawing, a portion of these gases may be returned to the combustion gas generator. The catalyst suspended in water is passed through line 19 and valve 20 to filter 21 from which the water is removed through line 22, containing valve 23. The catalyst may be removed through line 24. This step need not be restricted to any given type of filter, but may comprise any suitable filter press or other separating device which is the equivalent. If desired, water may be added to separator 16 through line 25 containing valve 26, in order to produce a slurry of the powdered catalyst in separator 16.

The particular advantage of the invention is apparent from the drawing, since without the use of steam and the cooling system a considerable quantity of the catalyst powder, which is like fine dust, is carried out of the system through lines 17 and 18.

The catalytic agents contemplated for reactivation in the present invention comprise among others naturally occurring earths, such as clays of the Montmorillonite type which may or may not have been activated by treatment with acids or other chemicals.

Other types of catalytic agents are synthetic materials comprising a major portion of precipitated silica and a minor portion of a refractory oxide, such an alumina, zirconia, thoria, titania, and the like, which have been prepared by the separate or simultaneous precipitation of the components under conditions such that particles approaching colloidal dimensions are obtained. The precipitation or combination is followed by washing under such conditions that alkali metal ions are removed substantially completely. This type of catalyst may be still further modified by having added thereto compounds, and particularly the oxides of elements such as chromium, molybdenum, vanadium, uranium, etc.

Another type of catalytic agent comprising relatively inert supports, such as alumina, magnesia, silica, titania, zirconia, zinc oxide, etc., having deposited thereon relatively minor quantities of oxides or sulfides of metals appearing in the left-hand column of groups IV, V and VI of the periodic table.

In addition, heavy metal oxides possessing catalytic properties either alone or on supports may be treated according to this invention.

These catalytic agents may be used for a variety of hydrocarbon conversion reactions including catalytic cracking, catalytic reforming, catalytic polymerization, catalytic isomerization, catalytic dehydrogenation, catalytic hydrogenation, etc. The catalysts are not all useful for the same process and those which may be used interchangeably in any given process are not necessarily exactly equivalent in their action. Catalysts soluble in water cannot be reactivated by the present process.

When activated in the presence of air or other oxygen-containing gases, the finely divided catalytic materials which are most useful in processes involving powdered catalysts, are relatively difficult to separate from the reactivating gases, since relatively large volumes of gas are required and the catalysts are so finely divided. As a consequence, expensive separating and recovery equipment must be installed, or considerable quantities of catalyst may be carried away with the spent reactivation gases.

Furthermore, it is undesirable to carry out the reactivation at temperatures above 1500° F., and it is desirable to keep the reactivation temperature as low as possible—preferably from about 900° to 1200° F. or thereabouts. The present invention offers a means of preventing excessive rise in temperature by adding steam at a lower temperature to serve as a cooling medium, and a method for recovering the powdered catalyst readily without the use of special equipment.

The reactivation may be carried out by contacting the catalyst with an oxygen-containing gas, which may contain, for example, from 1 to 10% or more of oxygen and may comprise a mixture of relatively inert gases such as flue gases and air. Any conventional type of equipment, such as rotating kilns, vertical kilns, clay burners, etc., may be used. The operation may be carried out at atmospheric or slightly super-atmospheric pressures, since the use of pressure tends to initiate burning at lower temperatures. Steam is injected into the reactivation space, or part or all of the steam may be injected into the mixture of catalyst and spent reactivating gases at the exit after the reactivation has taken place. Injecting the steam at this point has the advantage that it assists in cooling the reaction mixture from the high temperatures used in reactivation to a much lower temperature level. The use of steam in the reactivation space tends to lower the temperature at which reactivation takes place. The quantity of steam used in the reactivation should be sufficient to supply enough water when it condenses to cause the catalyst to settle out of the gas substantially completely.

The amount will vary with the different catalysts depending on their porosity and adsorptive capacity for water. Some additional water may be added to form a slurry which may be pumped to suitable separating or filtering equipment whereby the catalyst may be recovered from the water. Alternatively, enough steam may be used so that the catalyst-water mixtures after the condensation step, is in the form of a creamy slurry. The recovered catalyst may be dried before being used again.

It is well known that relatively small quantities of steam have been used to assist in reactivation of carbonized materials. The present invention is different from the previous art in the respect that the condensed steam serves as a means of separating the powdered catalyst from the reactivating gases. The quantities necessary are much larger than contemplated in previously used processes so that the effect is not inherent therein.

By way of illustrating the invention I may reactivate any of the previously described catalysts in the manner described. Specifically, reactivation of the silica-alumina type catalyst, used for catalytically cracking mineral oils, such as gas oil, at temperatures in excess of 500° F., may be carried out and the catalytic activity of the spent catalyst restored to approximately 90% of that of the original catalyst. More than 98% of the catalyst charged to the reactivator may be recovered by this method.

I claim as my invention:

1. A process for reactivating carbonized powdered catalyst which comprises dispersing the powdered catalyst in an oxygen-containing gas, subjecting the resultant mixture to combustion in a combustion zone to burn carbonaceous matter from the catalyst, thereby forming a suspension of catalyst powder in gas, removing said suspension from the combustion zone and then cooling the same to below the boiling point of water in admixture with a sufficient quantity of steam to supply, on condensation thereof, an amount of water adequate to separate from said suspension removed from the combustion zone substantially all of the catalyst powder contained in the suspension, separating the water containing the powdered catalyst from the uncondensed gaseous content of said suspension, and finally separating the powdered catalyst from the water.

2. The process as defined in claim 1 further characterized in that at least a portion of said steam is introduced to the combustion zone.

3. The process as defined in claim 1 further characterized in that at least a portion of said steam is commingled with said suspension after removal of the latter from the combustion zone, the steam thus commingled being at a lower temperature than the suspension.

4. The process as defined in claim 1 further characterized in that separate portions of said steam are introduced to the combustion zone and to the suspension removed from the combustion zone.

5. The process as defined in claim 1 further characterized in that the total quantity of said steam is introduced to the combustion zone.

ROLAND B. DAY.